United States Patent
Kraeling et al.

(10) Patent No.: US 9,237,033 B2
(45) Date of Patent: *Jan. 12, 2016

(54) SYSTEM AND METHOD FOR COMMUNICATING DATA IN A VEHICLE SYSTEM

(71) Applicant: General Electric Company, Schenectady, NY (US)

(72) Inventors: Mark Bradshaw Kraeling, Melbourne, FL (US); Jared Klineman Cooper, Melbourne, FL (US); Todd William Goodermuth, Melbourne, FL (US); Christopher Michael Wiesner, Lawrence Park, PA (US); Andrew Allan Clark McKay, Oakbank (CA); Bradley Dale Brown, Oakbank (CA)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,384

(22) Filed: Nov. 20, 2014

(65) Prior Publication Data
US 2015/0073622 A1    Mar. 12, 2015

Related U.S. Application Data

(63) Continuation of application No. 13/705,505, filed on Dec. 5, 2012, now Pat. No. 8,914,170.

(60) Provisional application No. 61/568,151, filed on Dec. 7, 2011.

(51) Int. Cl.
*H04L 5/00*    (2006.01)
*G06F 17/00*    (2006.01)
(Continued)

(52) U.S. Cl.
CPC ............ *H04L 12/4633* (2013.01); *H04L 12/40* (2013.01); *H04L 45/74* (2013.01); *H04L 45/741* (2013.01); *H04L 67/12* (2013.01); *H04L 67/125* (2013.01); *H04L 2012/40293* (2013.01)

(58) Field of Classification Search
CPC ..... H04L 12/40; H04L 12/4633; H04L 45/74; H04L 2012/40293; H04L 67/125; H04L 67/12; H04L 45/741
USPC ............... 701/1, 19; 180/14.1, 14.4; 370/392, 370/401, 402, 466, 467, 469; 375/219, 220, 375/258; 104/88.01, 88.09, 307; 105/26.05; 246/167 R
See application file for complete search history.

(56) References Cited

U.S. PATENT DOCUMENTS

| | | |
|---|---|---|
| 2002/0198840 A1 | 12/2002 | Banka et al. |
| 2008/0189436 A1 | 8/2008 | Vaswani et al. |
| 2011/0282525 A1 | 11/2011 | Kraeling et al. |

OTHER PUBLICATIONS

AU Examination Report issued in connection with corresponding Application No. 2012347816 on Jan. 19, 2015.

*Primary Examiner* — Russell Frejd
(74) *Attorney, Agent, or Firm* — GE Global Patent Operation; John A. Kramer

(57) ABSTRACT

A system includes a router transceiver unit that is configured to be disposed on-board a vehicle system. The vehicle system may have at least a source vehicle and a separate linked vehicle that are communicatively linked with each other through a system network of the vehicle system. The router transceiver unit is configured to be communicatively coupled to a requesting operational component of the source vehicle and the system network. The router transceiver unit is also configured to receive a local data packet from the requesting operational component that is directed toward a target operational component of the linked vehicle. The router transceiver unit includes an encapsulation module that is configured to transform the local data packet into an in-tunnel data packet, wherein the local and in-tunnel data packets have different packet formats.

31 Claims, 6 Drawing Sheets

(51) Int. Cl.
*H04L 12/46* (2006.01)
*H04L 12/56* (2006.01)
*H04L 12/741* (2013.01)
*H04L 12/40* (2006.01)
*H04L 29/08* (2006.01)

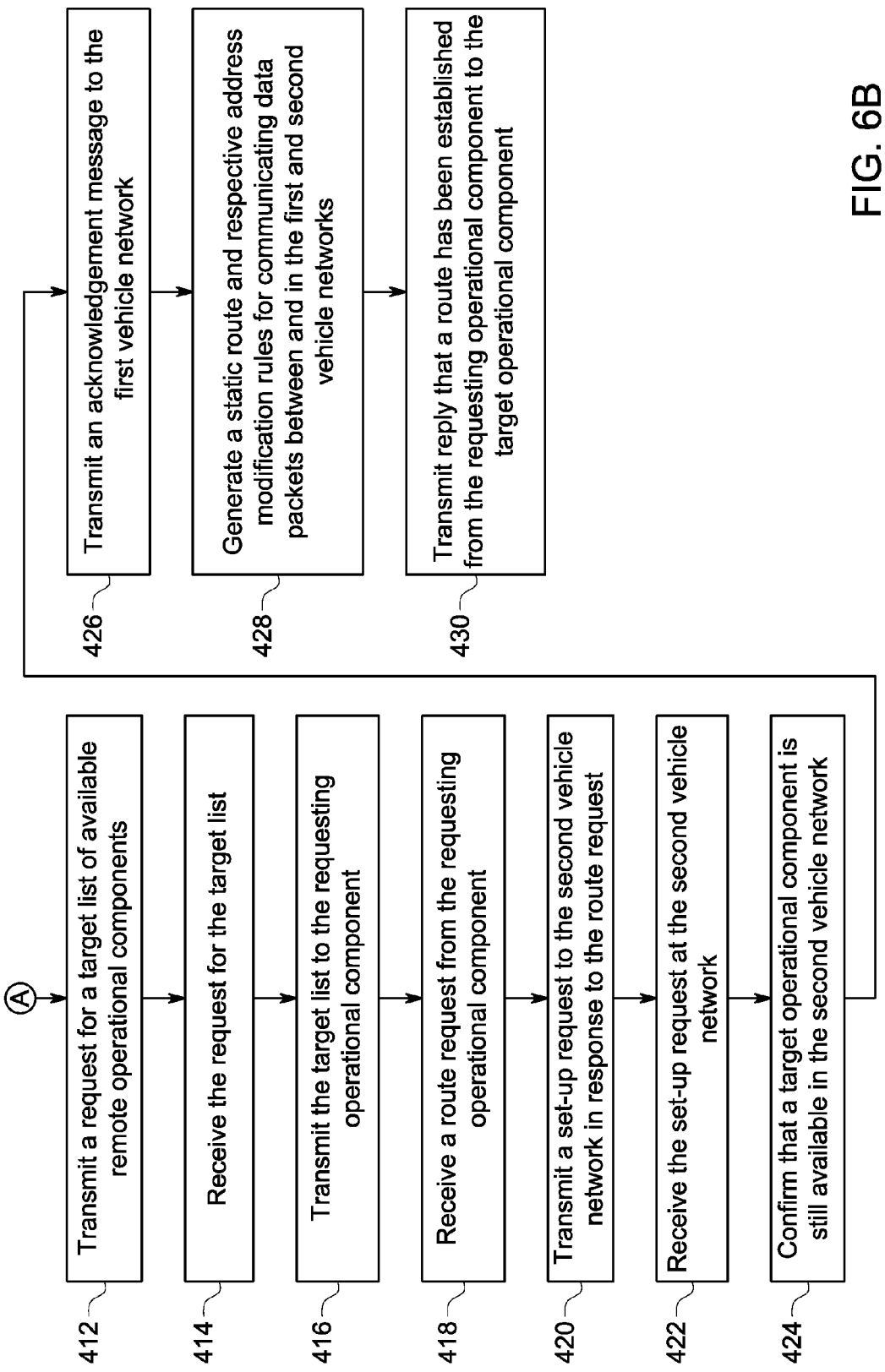

SYSTEM AND METHOD FOR COMMUNICATING DATA IN A VEHICLE SYSTEM

The present application is a continuation of U.S. application Ser. No. 13/705,505, filed Dec. 5, 2012, now U.S. Pat. No. 8,914,170 issued Dec. 16, 2014, which claims the benefit of U.S. Provisional Patent Application No. 61/568,151, filed on Dec. 7, 2011, both of which are incorporated herein by reference in their entireties.

FIELD

Embodiments of the subject matter described herein relate to data communications between different vehicles of a vehicle system.

BACKGROUND

A vehicle system that includes multiple vehicles coupled together to travel together along a route may be known as a vehicle consist. For example, a vehicle system may include one or more powered vehicles that may be mechanically linked (directly or indirectly) to non-powered vehicles. The powered and non-powered vehicles of the vehicle system may travel as a group along a designated route. In cases where the vehicle system includes multiple powered vehicles, the vehicle system may coordinate operations of the powered vehicles to move the vehicle system. For example, a train may include a locomotive consist that has one or more locomotives mechanically coupled to one or more rail cars. Locomotives in a single consist may include a lead locomotive and one or more remote locomotives. The lead locomotive may control operation of the remote locomotive(s). More specifically, the lead locomotive may coordinate tractive and braking operations of the different locomotives to control movement of the locomotive consist. In some cases, a single train may include a plurality of such locomotive consists. The locomotive consists may communicate with one another to coordinate tractive and braking operations of the train.

Two or more of the vehicles in a vehicle system may each include an on-board controller or other electronics that are connected to a respective on-board vehicle communications network. In certain cases, it may be desirable to link the individual on-board vehicle communications networks, such that electronics of one vehicle can communicate with electronics of other vehicles. However, in certain systems, it may be the case that electronics on different vehicles will have the same network address (e.g., IP address). For example, in certain PTC (positive train control) systems or other train safety systems, standards may be adopted requiring that in each PTC-equipped locomotive, equipment used for PTC communications and control (e.g., PTC radio and PTC controller) have the same network addresses, as a function of category. For example, all PTC radios may have a first common network address, all PTC controllers may have a second common network address, and so on. This enables on-board electronics to communicate with each other within the corresponding vehicle communications network using the same known network addresses. For example, for communicating a PTC message to a PTC radio, a PTC controller can generally transmit a message to a common network address, without having to determine a specific network address for the PTC radio or otherwise.

If multiple vehicles each have on-board equipment with the same network address, however, and the network address cannot be changed because of system constraints (e.g., PTC standards), then connecting the vehicles in a local area network can cause addressing conflicts. This may result in poor network performance, system communication errors, control system errors (e.g., the wrong vehicle subsystems receiving and responding to the wrong messages), system inoperability, or the like.

BRIEF DESCRIPTION

In an embodiment, a system comprises a router transceiver unit configured to be disposed on-board a vehicle system having at least a source vehicle and a separate linked vehicle that are communicatively linked with each other through a system network of the vehicle system. The router transceiver unit is configured to be communicatively coupled to a requesting operational component of the source vehicle and the system network. The router transceiver unit is also configured to receive a local data packet from the requesting operational component that is directed toward a target operational component of the linked vehicle. The local data packet is in a first packet format, and the router transceiver unit includes an encapsulation module configured to transform the local data packet that is received by the router transceiver unit from the requesting operational component in the first packet format into an in-tunnel data packet by changing a format of the local data packet from the first packet format to a different, second packet format that is configured to be communicated by the router transceiver unit through the system network to the linked vehicle.

In another embodiment, a system comprises a router transceiver unit configured to be disposed on-board a vehicle system having at least a source vehicle and a separate linked vehicle that are communicatively linked with each other through a system network of the vehicle system. The router transceiver unit is configured to be communicatively coupled to a target operational component of the linked vehicle and the system network. The router transceiver unit is also configured to receive an in-tunnel data packet from a requesting operational component of the source vehicle that is directed toward the target operational component of the linked vehicle. The router transceiver unit includes a translation module configured to transform the in-tunnel data packet that is received from the requesting operational component into a local data packet by changing a packet format of the in-tunnel data packet. The local data packet has a first packet format and the in-tunnel data packet has a second packet format, the first and second packet formats differing from each other.

In another embodiment, a method comprises communicatively coupling at least a source vehicle and a separate linked vehicle that are communicatively linked with each other through a system network of the vehicle system. The method further comprises receiving a local data packet from an operational component of the source vehicle, wherein the local data packet is in a first packet format. The method further comprises transforming the local data packet into an in-tunnel data packet having a second packet format that differs from the first packet format and that is configured to be communicated through the system network to the linked vehicle.

In another embodiment, a method comprises communicatively coupling at least a source vehicle and a separate linked vehicle that are communicatively coupled with each other through a system network of the vehicle system. The method further comprises receiving an in-tunnel data packet at the linked vehicle, the in-tunnel data packet being sent from the source vehicle of the vehicle system. The method further comprises transforming the in-tunnel data packet into a local data packet by changing a packet format of the in-tunnel data packet. The local data packet has a first packet format and the in-tunnel data packet has a second packet format that differs from the first packet format. The local data packet is configured to be communicated within the linked vehicle to a target operational component. The in-tunnel data packet is configured to be communicated between the source and linked vehicles.

In another embodiment, a method comprises communicatively coupling first and second linked vehicles that are communicatively coupled through a system network of the vehicle system. The first and second linked vehicles have first and second vehicle networks, respectively. The method further comprises communicatively coupling the first vehicle network to a first operational component disposed on-board the first linked vehicle. The method further comprises communicatively coupling the second vehicle network to a second operational component disposed on-board the second linked vehicle. The first operational component has a common network address and the second operational component has the same common network address. The method further comprises assigning first and second in-tunnel addresses that correspond to the first and second operational components, respectively, wherein the first and second in-tunnel addresses are different from each other such that router transceiver units disposed onboard the first and second linked vehicles communicate data between the first and second operational components using the respective first and second in-tunnel addresses.

BRIEF DESCRIPTION OF THE DRAWINGS

The inventive subject matter will be better understood from reading the following description of non-limiting embodiments, with reference to the attached drawings, wherein below:

FIGS. 6A and 6B illustrate a flowchart of a method for communicating between different vehicles of a vehicle system in accordance with one embodiment.

DETAILED DESCRIPTION

Figure 1:
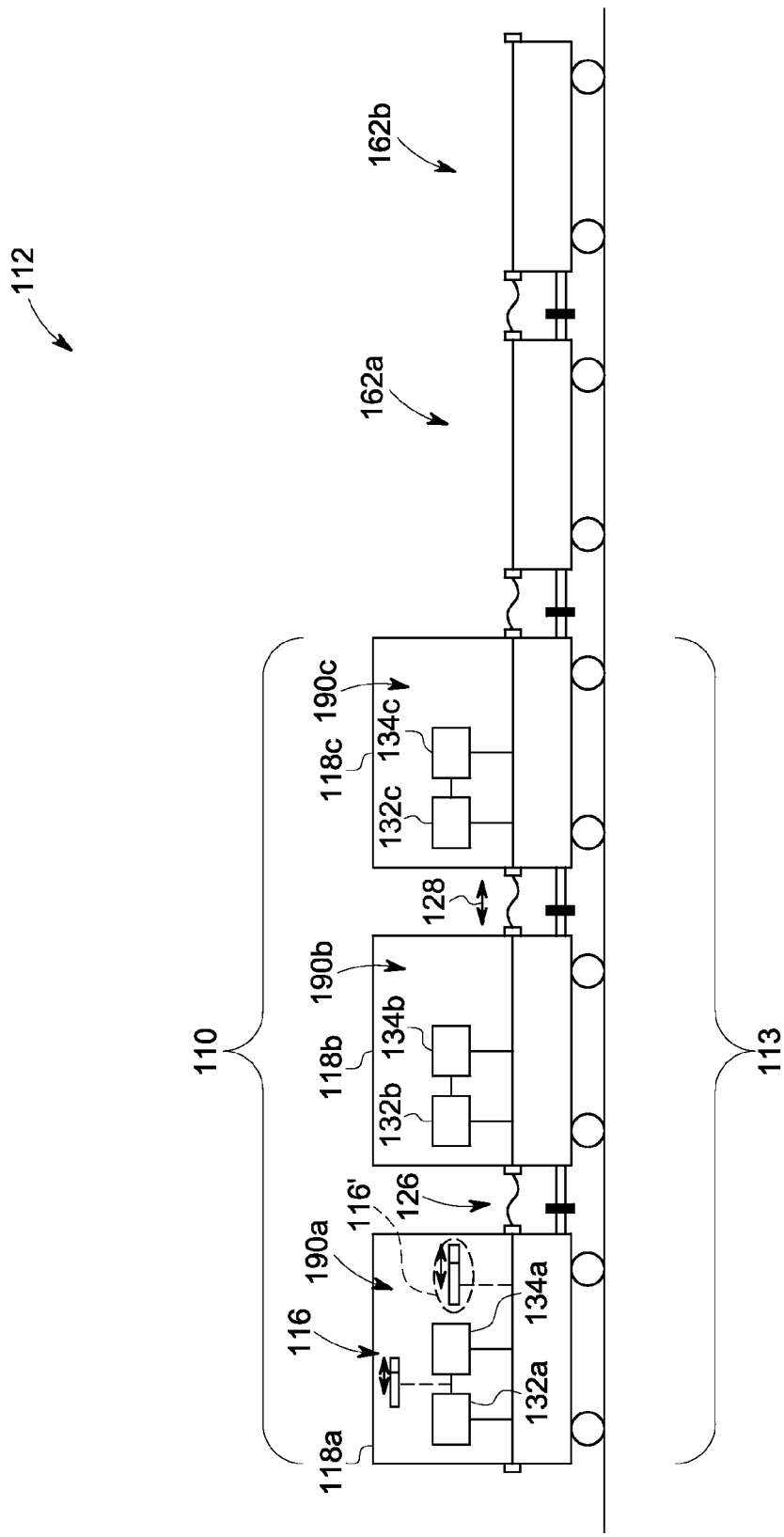
FIG. 1 is a schematic diagram of a system network for communicating data in a vehicle consist, according to an embodiment.

Embodiments described herein may be implemented using, or in conjunction with, subject matter described in commonly owned U.S. Application Publication Nos. US-2011-0282525, filed on Jul. 25, 2011; US-2011-0093144, filed on Dec. 29, 2010; US-2010-0241295, filed on Jan. 7, 2010; US-2011-0099413, Oct. 20, 2010; and US-2011-0270475, filed on Jul. 15, 2011, each of which is hereby incorporated by reference herein in its entirety.

One or more embodiments of the inventive subject matter described herein provide methods and systems for communicating data in a vehicle system. The vehicle system may include a plurality of vehicles that are mechanically coupled or linked together (directly or indirectly) and communicatively coupled to each other. Each of the vehicles may have a corresponding vehicle network. Embodiments described may enable data communications within each of the vehicle networks (e.g., intra-network) and data communications between different vehicle networks (e.g., inter-network). In some embodiments, the intra-network communications and the inter-network communications are executed in accordance with different communications protocols.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

The data communicated between the vehicles may be network data. In some embodiments, "network data" includes data packets that are configured in a designated packet format. For example, data may be packaged into a data packet that includes a set of data bits that are arranged to form a control portion and a payload portion. The control portion of the data bits may correspond to addresses (e.g., source, destination), error detection codes (e.g., checksums), and sequencing information. The control portion may be found in packet headers and trailers of the corresponding data packet. The payload portion of the data bits may correspond to the information that was requested and/or is used by the vehicle system for a designated purpose, such as for making operational decisions and/or for controlling operations (e.g., tractive efforts, braking efforts, and the like) of the vehicle system. The payload portion may include operating data. Operating data may include different types of data from various components of a vehicle system that are used to control operation of the vehicle system. For example, the operating data may include information from sensors that indicates a performance level or state of a component of the vehicle system. For instance, pressure sensors may be configured to transmit signals indicative of a performance of a braking system (e.g., current brake line pressure). Fuel sensors may be configured to transmit signals that are indicative of a current fuel level or current fuel efficiency. In rail vehicle systems, sensors coupled to the engine or motors may transmit data that indicates a notch (or throttle) level of the rail vehicle system. Sensors may also be coupled to various elements of mechanical systems (e.g., motors, engines, braking systems) and transmit signals when a corresponding element is properly operating and/or has failed. Operating data may also include information from data radios and global positioning system (GPS) units. GPS units may transmit information describing or indicating a position of the vehicle system. Data radios may transmit information regarding one or more different vehicles of the vehicle system.

The payload portion, however, may include other types of data. For example, the payload portion may include planning data that is used by a controller of the vehicle system to generate and/or modify a trip or mission plan. The trip or mission plan may designate operations of the vehicle system over the course of a trip along one or more routes (e.g., tracks, roads, waterways, or the like) in order to achieve some goal, such as to reduce fuel consumption, emissions generation, required shift changes between different teams of operators of the vehicle system, and the like. For example, a trip plan may designate tractive output (e.g., tractive effort, power output, speed, acceleration, and the like) and/or braking effort as a function of time elapsed during the trip and/or distance along a route of the trip such that, if the vehicle system actually operates according to the designated operations (e.g., designated operational settings), the vehicle system will reduce the amount of fuel consumed, reduce the amount emissions generated, reduce the number of times that the vehicle system must stop to change out one or more human operators of the vehicle system, or the like, relative to another, different trip plan that designates one or more different operations of the vehicle system.

The planning data that is used to generate and/or modify a trip plan can include at least one of vehicle data, route data, or trip data to generate the trip plan and may also include the operating data described above. Vehicle data may include information on the characteristics of the vehicle. For example, when the vehicle system is a rail vehicle, the vehicle data may include a number of rail cars, number of locomotives, information relating to an individual locomotive or a consist of locomotives (e.g., model or type of locomotive, weight, power description, performance of locomotive traction transmission, consumption of engine fuel as a function of output power (or fuel efficiency), cooling characteristics), load of a rail vehicle with effective drag coefficients, vehicle-handling rules (e.g., tractive effort ramp rates, maximum braking effort ramp rates), content of rail cars, lower and/or upper limits on power (throttle) settings, etc.

Route data may include information on the route, such as information relating to the geography or topography of various segments along the route (e.g., effective track grade and curvature), speed limits for designated segments of a route, maximum cumulative and/or instantaneous emissions for a designated segment of the route, locations of intersections (e.g., railroad crossings), locations of certain track features (e.g., crests, sags, curves, and super-elevations), locations of mileposts, and locations of grade changes, sidings, depot yards, and fuel stations.

Trip data may include information relating to a designated mission or trip, such as start and end times of the trip, start and end locations, route data that pertains to the designated route (e.g., effective track grade and curvature as function of milepost, speed limits), upper cumulative and/or instantaneous limits on emissions for the trip, fuel consumption permitted for the trip, historical trip data (e.g., how much fuel was used in a previous trip along the designated route), desired trip time or duration, crew (user and/or operator) identification, crew shift expiration time, lower and/or upper limits on power (throttle) settings for designated segments, etc.

With respect to the network data, the data packets may be packaged and communicated in accordance with a designated communications protocol. The designated communications protocol may include predetermined rules and formats for exchanging data packets between nodes or computing systems. Various communications protocols may be used for embodiments described herein including, but not limited to, an industry standard communications protocol, a proprietary communications protocol, and/or an open-source or publicly available communications protocol. In some embodiments, the data packets are packaged and communicated according to an Internet-layer type protocol for packet-switched internetworking. For example, the data packets may be packaged and communicated in accordance with Internet Protocol version 6 (IPv6) or in accordance with Internet Protocol version 4 (IPv4). Alternatively or additionally, the data packets may be packaged and/or communicated in accordance with another IP protocol version or another protocol. The network data 116 may be generally configured for the Internet protocol suite, which may be referred to as TCP/IP due to the Internet protocol suite including the Transmission Control Protocol (TCP) and Internet Protocol (IP). The network data 116 may also be configured according to the Session Initiated Protocol (SIP). Other communications protocols, however, exist and may be used by alternative embodiments. As described herein, certain portions of a system network may be configured for transmitting network data packets in a first packet format and other portions of the same system network may be configured for transmitting network data packets in a second packet format.

The data communicated between the vehicles may also be non-network data. Non-network data may be data that is not packaged or formatted according to the same communications protocol as the network data described herein. By way of example only, the non-network data may include legacy data that is communicated between vehicles using a protocol that is not an Internet-layer protocol. Although not packaged the same as network data, content of the non-network data may include information for operating or controlling the vehicle system (e.g., operating data as described above). In some embodiments, the non-network data may be transmitted at lower bandwidth rates relative to the higher bandwidth rates (e.g., 10 Mbit/sec or greater) of the network data. The non-network data may also be transmitted over a different communication pathway than the network data.

In some embodiments, data may be communicated within a vehicle or among two or more vehicles of the vehicle system using a tunneling technique. For instance, a first data packet may be encapsulated within a second data packet at one node of a system network of the vehicle system and transmitted to another node within the same system network, where the second data packet is decapsulated and the first data packet is communicated to a designated network device (e.g., an operational component). Tunneling techniques are described in greater detail below. In some cases, a designated communication route between two network devices may be established before the first data packet between the two network devices is sent.

Embodiments described herein may transmit network data to or receive network data from operational components of a vehicle in the vehicle system. Operational components may be any component that can be used by a vehicle system and that is capable of being communicatively coupled to a network. Operational components may provide information to the vehicle system and/or may be instructed to operate in a designated manner by the vehicle system. Non-limiting examples of operational components include data radios, voice radios, control display units (CDUs) or user interfaces for the operator of the vehicle system (e.g., an engineer), positioning equipment (e.g., GPS units), data recorders, video recorders, engine control systems, power operational components (e.g., alternators, energy storage units), tractive operational components (e.g., inverters, motors, dynamic braking resistive grids), navigation equipment, traffic message channel (TMC) device, on-board computers, sensors for various tractive or braking sub-systems (e.g., sensors that detect a throttle setting or sensors that detect pressure in the brake line), and the like. Operational components may be configured to communicate network data that includes at least one of operating data, vehicle data, route data, or trip data. Operational components may also receive the network data to facilitate operation of the vehicle system. The received network data may include instructions to the operational component for operating in a designated manner.

At least one technical effect of embodiments described herein may include reduction of addressing conflicts and communication errors that occur between vehicles of a vehicle system. Another technical effect may include a more efficient use of computing resources for controlling operation of the vehicle system. Another technical effect may include safer autonomous operation of the vehicle system. In yet another technical effect, embodiments described herein may be operative with existing communication systems for transmitting network data between vehicles without substantial modification or overhaul of the existing communications systems. These and other technical effects may improve the overall performance of the vehicle system.

FIG. 1 illustrates a system network (or communication system) 110 of a vehicle system 112 formed in accordance with one embodiment. The vehicle system 112 includes a plurality of vehicles (or units) 118a-118c and 162a, 162b that are mechanically coupled to one another. In some embodiments, the vehicle system 112 includes one or more vehicle consists 113. As used herein, a "vehicle consist" includes a group of vehicles that are mechanically coupled or linked together to travel along a route. Different vehicles of a vehicle consist may coordinate operations (e.g., tractive and braking efforts) with other vehicles in the consist to move the vehicle consist and, consequently, the vehicle system. The vehicle system 112 may include only a single vehicle consist or a plurality of vehicle consists. For such embodiments that include multiple vehicle consists, each vehicle consist may coordinate operations with other vehicle consists to move the vehicle system.

In the illustrated embodiment, the vehicle system 112 is a single vehicle consist that includes multiple vehicles or units. In other embodiments, however, the vehicle system 112 may include a plurality of vehicle consists that are directly or indirectly linked to one another in the vehicle system 112. As shown, the vehicle system 112 includes a plurality of powered vehicles 118a-118c. As used herein, a "powered vehicle" is a vehicle that is capable of self-propulsion. The vehicle system 112 may also include non-powered vehicles (or units) 162a, 162b that do not provide propulsive efforts. In the illustrated embodiment, the non-powered vehicles 162a, 162b are rail cars used for cargo and/or carrying passengers. The term "powered," however, refers to the capability of the powered vehicles 118a-118c to propel themselves and not to whether the powered vehicles 118a-118c or the non-powered vehicles 162a, 162b receive energy (e.g., electric current) for one or more purposes. For example, the non-powered vehicles 162a, 162b may receive electric current to power one or more loads disposed on-board the non-powered vehicles 162a, 162b.

In some embodiments, the vehicle 118a controls operation of the vehicles 118b and 118c and, as such, the vehicle 118a may be referred to as a lead vehicle and the vehicles 118b, 118c may be referred to as remote vehicles. The vehicles 118b, 118c may or may not trail the vehicle 118a when the vehicle system 112 is in motion. In alternative embodiments, however, control of the different operations of the vehicle system 112 may be distributed among a plurality of the vehicles. In the illustrated embodiment, each of the vehicles 118a-118c is adjacent to and mechanically coupled with another vehicle in the vehicle system 112 such that each and every vehicle is directly or indirectly connected to the other vehicles. In one or more embodiments, the non-powered vehicles 162a, 162b may be positioned before, after, or between the powered vehicles 118a-118c.

The system network 110 may include a plurality of sub-networks. For example, the system network 110 may be a wide area network (WAN) and the sub-networks may be local area networks (LANs). In the illustrated embodiment, each of the vehicles 118a-118c includes a corresponding vehicle network 190a-190c, respectively. In some embodiments, the vehicle networks 190a-190c may constitute separate LANs that are part of a WAN (e.g., the system network 110). Although not shown, the vehicles 162a, 162b may also include a vehicle network in alternative embodiments. In other embodiments, a first plurality or set of vehicles in the vehicle system may communicate with each other through a first LAN and a second plurality or set of vehicles in the vehicle system may communicate with each other through a second LAN. The first and second LANs may be part of a system network (e.g., WAN) of the vehicle system and communicate with each other as described herein.

In some embodiments, the system network 110 corresponds to a single vehicle consist (e.g., the vehicle consist 113). The vehicle system 112 may have a plurality of vehicle consists and, as such, the vehicle system 112 may include a plurality of system networks. Accordingly, in some embodiments, a single vehicle system 112 may include multiple WANs in which at least one of the WANs includes a plurality of vehicle networks (or LANs). In such embodiments, each of the vehicle consists may coordinate operations among the vehicles to move the vehicle system. The vehicle consists may also coordinate operations with one another to move the vehicle system. Embodiments described herein may be applicable to communications between vehicles of a single vehicle consist and/or communications between multiple vehicle consists of a vehicle system.

Each of the vehicle networks 190a-190c may include a plurality of operational components that are communicatively coupled to the corresponding vehicle network. Each of the operational components may have a network address (e.g., IP address) within the corresponding vehicle network. The network address may be a static or designated address that is established or assigned by an industry or proprietary standard or the address may be a dynamic address designated by the system network 110. The network data 116 may be transmitted between the different vehicles 118a-118c of the vehicle system 112 or, more specifically, between the different vehicle networks 190a-190c. For example, the network data 116 may be transmitted from the vehicle 118a to the vehicle 118b. In some embodiments, data transmitted within the vehicle networks 190a-190c (e.g., intra-network) is configured for one communications protocol, and data transmitted between the vehicle networks 190a-190c in the system network 110 (e.g., inter-network) is configured for a different communications protocol.

As shown in FIG. 1, the network data 116 may be transmitted over a communication channel or line, such as a multiple unit (MU) cable system 126. The MU cable system 126 may include an electrical bus that interconnects the lead powered vehicle 118a and the remote powered vehicles 118b, 118c in the vehicle system 112.

In some embodiments, the network data 116 may be transformed (e.g., modified, modulated, and/or converted) prior to transmission over the MU cable system 126. The transformed network data is indicated at 116'. For example, transformed network data may be data that is at least one of encapsulated or modulated. When data is encapsulated and/or modulated, the data may be changed from one form to a second, different form. Depending on the form, the data may be configured for transmission within a vehicle network or, separately, may be configured for transmission between vehicle networks. This transformed network data may be subsequently decapsulated (or translated) or demodulated such that the data is changed from the second form to the first form. In other embodiments, the data may be changed from the second form to a different, third form when the modified data is decapsulated or demodulated.

By way of example, in some embodiments, the network data may be transformed to have different packet formats as the network data is communicated throughout the system network 110. For example, the network data 116 may be configured according to one type of communications protocol (e.g., IPv4) so that the network data 116 may be transmitted within the vehicle network 190a. To be transmitted to the vehicle networks 190b or 190c, however, the network data 116 may be transformed according to another type of communications protocol (e.g., IPv6) so that the network data 116' may be transmitted through a portion of the system network 110 that joins the vehicle networks 190a-190c. More specifically, at a node that connects the vehicle network 190a and the system network 110, the data packet of a first packet format may be encapsulated within a data packet of a different second packet format thereby providing the modified network data.

In some cases, different communications protocols use different packet formats. Different packet formats may follow different rules for arranging the data bits within a data packet and, as such, may not be suitable for other communications protocols. For example, different packet formats may have different addressing schemes. The different addressing schemes may prevent the data packets from being received or accepted by other devices on a network. IPv4 uses 32-bit addresses and IPv6 uses 128-bit addresses. The two communications protocols, however, may not be compatible such that some IPv6 devices in a network cannot receive and route IPv4 data packets. Accordingly, embodiments described herein may transform the network data so that the data may be communicated between the different vehicle networks 190a-190c. As will be described below, when the data packets of the transformed network data are received at another vehicle network, the data may be transformed again into data packets having the original packet format. For these communication functions, the system network 110 may include router transceiver units 134a, 134b, 134c that are disposed on-board the vehicles 118a, 118b, 118c, respectively, and are described in greater detail below. The router transceiver units 134a, 134b, 134c may be communicatively coupled to operational components 132a, 132b, 132c, respectively, which are also disposed on-board the respective vehicles.

In addition to the encapsulation described above, the network data 116 may also be modulated to be orthogonal to the non-network data 128 that is transferred between vehicles over the MU cable system 126. Modulating the network data to be orthogonal to non-network data may avoid interference between the two signals.

Figure 2:
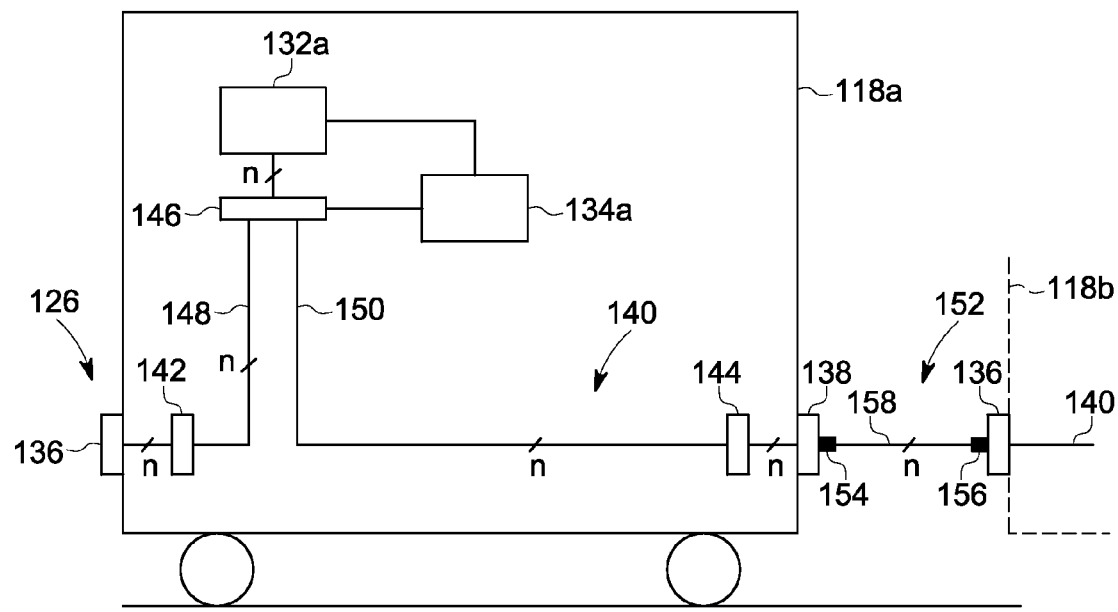
FIG. 2 is a schematic diagram of a multiple unit (MU) cable system in a vehicle, shown in the context of the system network of FIG. 1.

FIG. 2 shows the vehicle 118a and the MU cable system 126 in greater detail. However, it is noted that FIG. 2 illustrates one example of a powered vehicle and MU cable system and that other configurations may be possible. In some embodiments, the MU cable system 126 may be an existing electrical bus interconnecting the vehicle 118a and the vehicles 118b, 118c (FIG. 1) in the vehicle consist 113 (FIG. 1). For each of the vehicles 118a-118c, the MU cable system 126 comprises a first MU port 136, a second MU port 138, and an internal MU electrical system 140 that connects the first port 136 and the second port 138 to one or more operational components 132a of the vehicle 118a. In the illustrated example, the internal MU electrical system 140 comprises a first terminal board 142 electrically connected to the first MU port 136, a second terminal board 144 electrically connected to the second MU port 138, a central terminal board 146, and first and second electrical conduit portions 148, 150 electrically connecting the central terminal board 146 to the first terminal board 142 and the second terminal board 144, respectively. The one or more operational components 132a of the vehicle 118a may be electrically connected to the central terminal board 146 and, thereby, to the MU cable system 126 generally.

Figure 3:
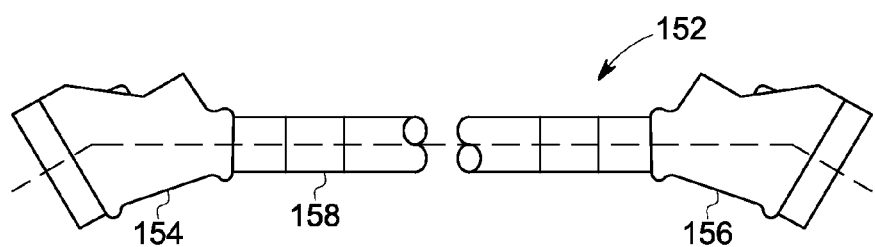
FIG. 3 is a schematic diagram of an MU cable jumper.

As shown in FIGS. 2 and 3, the MU cable system 126 further comprises an MU cable jumper 152. The jumper 152 comprises first and second plug ends 154, 156 and a flexible cable portion 158 electrically and mechanically connecting the plug ends together. The plug ends 154, 156 fit into the MU ports 136, 138 (FIG. 2). The MU cable jumper 152 may be electrically symmetrical, meaning either plug end can be attached to either port. The MU cable jumper 152 is used to electrically interconnect the internal MU electrical systems 140 (FIG. 2) of the adjacent vehicles 118a, 118b. As shown in FIG. 2, for each adjacent pair of vehicles 118a, 118b, one plug end 154 of an MU cable jumper 152 is attached to the second MU port 138 of the powered vehicle 118a, and the other plug end 156 of the MU cable jumper 152 is attached to the first MU port 136 of the powered vehicle 118b. The flexible cable portion 158 of the MU cable jumper 152 extends between the two plug ends, providing a flexible electrical connection between the two vehicles 118a, 118b.

Depending on the particular type and configuration of the vehicle, the electrical conduit portions 148, 150 and MU cable jumpers 152 may be configured in different manners, in terms of the number "n" ("n" is a real whole number equal to or greater than 1) and type of discreet electrical (or wireless) communication pathways. In one example, each conduit portion 148, 150 and the jumper cable portion 158 comprises a plurality of discreet electrical wires, such as 12-14 gauge copper wires. In another example, the cable portion 158 (of the MU cable jumper 152) comprises a plurality of discreet electrical wires, while the conduit portions 148, 150 each include one or more discreet electrical wires and/or non-wire electrical pathways, such as conductive structural components of the vehicle, pathways through or including electrical or operational components, circuit board traces, or the like. Although certain elements in FIG. 2 are shown as including "n" discreet electrical pathways, it should be appreciated that the number of discreet pathways in each element may be different, i.e., "n" may be the same or different for each element.

In some embodiments, the plug ends 154, 156 may include a plurality of electrical pins, each of which fits into a corresponding electrical socket in an MU port. The number of pins and sockets may depend on the number of discreet electrical pathways extant in the internal electrical system 140, MU cable jumper 152, etc. In one example, each plug end 154, 156 is a twenty seven-pin plug.

The central terminal board 146, the first terminal board 142, and the second terminal board 144 may each comprise an insulating base (attached to the vehicle) on which terminals for wires or cables have been mounted. This may provide flexibility in terms of connecting different operational components to the MU cable system.

In addition to the network data 116 (FIG. 1), the MU cable system 126 may be used in the vehicle system 112 (or the vehicle consist 113) for transferring non-network data 128 (FIG. 1) between the vehicles 118a, 118b, 118c. In some embodiments, the non-network data 128 is transmitted over the MU cable system 126 according to a designated voltage carrier signal (e.g., a 74 volt on/off signal, wherein 0V represents a digital "0" value and +74 volts a digital "1" value, or an analog signal of 0V-74V, wherein the 0-74V voltage level may represent a specific level or percentage of functionality). The non-network data 128 may be transmitted and received using one or more of the operational components 132a-132c.

The term "MU cable system" refers to the entire MU cable system or any portion(s) thereof, e.g., terminal boards, ports, cable jumper, conduit portions, and the like. As should be appreciated, when two vehicles are connected via an MU cable jumper 152, both the MU cable jumper 152 and the internal MU electrical systems 140 of the two vehicles together are part of the MU cable system. As subsequent vehicles are attached using additional MU cable jumpers 152, those cable jumpers and the internal MU electrical systems 140 of the subsequent vehicles also become part of the MU cable system.

As should be appreciated, it may be the case that certain vehicles in a vehicle consist are network equipped according to the system and method, e.g., outfitted with a router transceiver unit, and that other vehicles in the consist are not equipped as such. For example, there may be first and third network-equipped vehicles physically separated by a second vehicle that is not network equipped. In this case, the first and third vehicles are still able to communicate and exchange data even though there is a non-network equipped vehicle between them. This may be possible due to the MU cable system 126 extending through the non-equipped vehicles or having a wireless interface. In one case, for example, a vehicle consist comprises first, second, and third vehicles, with the second vehicle being disposed between the first and third vehicles. A first router transceiver unit is positioned in the first vehicle, and a third router transceiver unit is positioned in the third vehicle. The second vehicle, however, does not have a router transceiver unit or other functionality for transmitting and/or receiving network data over the MU cable system. Nevertheless, network data is transmitted between the first and third vehicles through the second vehicle, with the network data passing through a portion of the MU cable system in the second vehicle but not being transmitted or received by the second vehicle.

In particular embodiments, the electrical cable system 126 may be an electronically controlled pneumatic brake (ECP) train line. ECP brakes on a train are defined by the Association of American Railroads 4200 series specifications. The standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Returning to FIG. 1, the system network 110 may include the router transceiver units 134a, 134b, 134c of the respective vehicles 118a, 118b, 118c. The router transceiver units 134a, 134b, 134c may be each communicatively coupled to the MU cable system 126. The router transceiver units 134a, 134b, 134c are configured to transmit and/or receive network data 116 over the MU cable system 126. In one embodiment, each router transceiver unit 134a, 134b, 134c receives network data 116 from a network device (e.g., operational components 132a, 32b, 32c), and transforms the received network data 116 into modified network data 116' (FIG. 1) for transmission over the MU cable system 126. Similarly, each router transceiver unit 134a, 134b, 134c may be configured to receive the transformed network data 116' over the MU cable system 126. In some embodiments, the router transceiver units 134a, 134b, 134c are configured to change the transformed network data 116' into a different form so that the original network data 116 may be used by other operational components. For example, the router transceiver units 134a, 134b, 134c may be configured to decapsulate or demodulate the transformed network data 116'.

Figure 4:
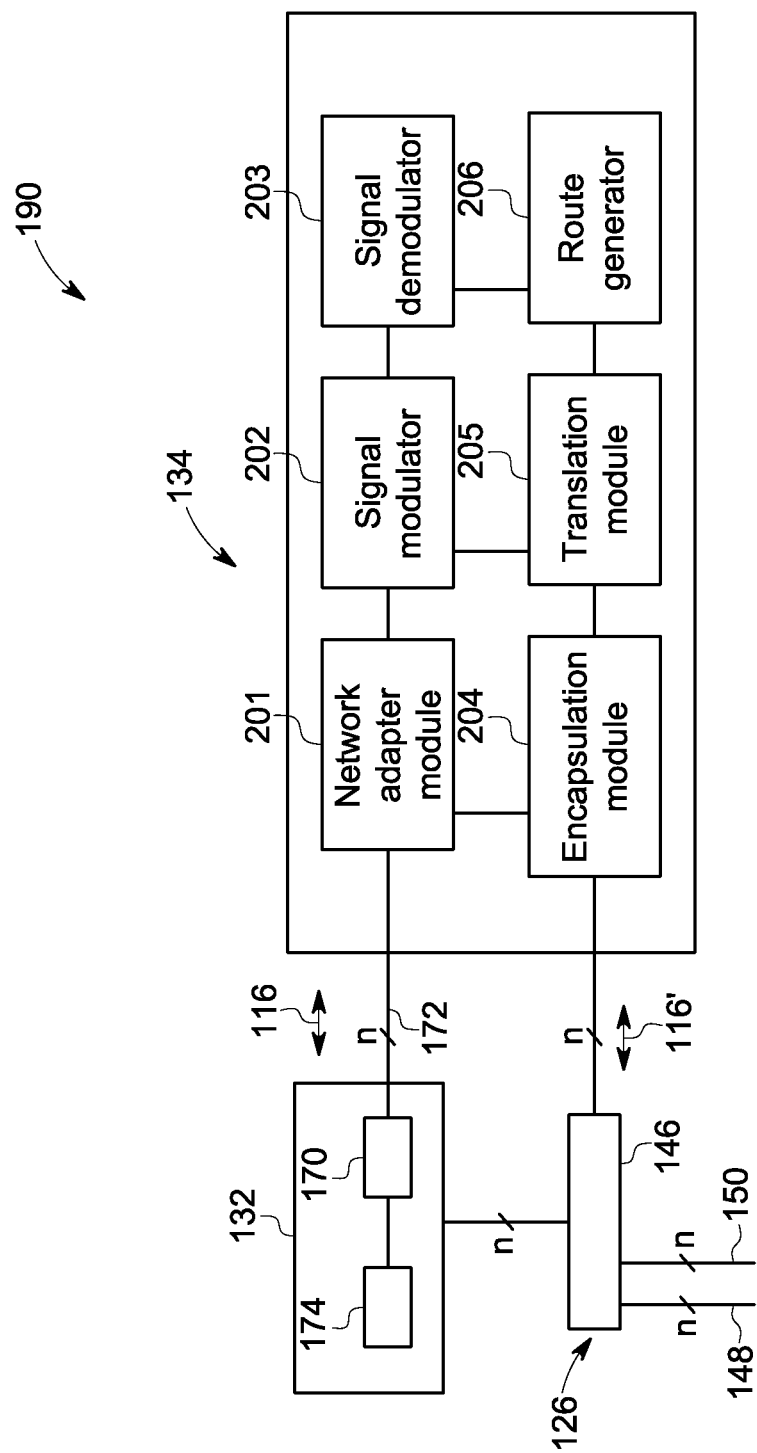
FIG. 4 is a schematic diagram of a router transceiver unit according to one embodiment.

FIG. 4 shows a portion of one embodiment of a vehicle network 190 including a router transceiver unit 134, which may be similar to the router transceiver units 134a, 134b, and/or 134c (FIG. 1). The router transceiver unit 134 may include a plurality of modules. The router transceiver unit 134 and/or each of the modules may include a computer processor (or a portion thereof) or other logic-based device that performs operations based on one or more sets of instructions (e.g., software). The instructions on which the modules operate may be stored on a tangible and non-transitory (e.g., not a transient signal) computer readable medium, such as a memory. The memory may include one or more computer hard drives, flash drives, RAM, ROM, EEPROM, and the like. Alternatively, one or more of the sets of instructions that direct operations of the modules may be hard-wired into the logic of the module, such as by being hard-wired logic formed in hardware.

In the illustrated embodiment, the router transceiver unit 134 may include a network adapter module 201, a signal modulator 202, a signal demodulator 203, an encapsulation module 204, a translation module 205, and a route generator 206. The modules 201-206 are configured to receive data (e.g., network data) and process and/or direct the data in a designated manner. Although FIG. 4 appears to indicate that each of the modules 201-206 is grouped together as a single structure, the modules 201-206 are not necessarily part of a common computing device or unit and, instead, may be separate components. Moreover, the router transceiver unit 134 is not required to include each and every one of the modules 201-206 shown in FIG. 4 or have the modules 201-206 interconnected to each other as shown.

The router transceiver unit 134 is communicatively coupled to the MU cable system 126. In the example shown in FIG. 4, the router transceiver unit 134 is electrically connected to the MU cable system 126 by way of the central terminal board 146, which may be positioned near a vehicle operational component 132. The network adapter module 201 may be electrically connected to a network interface unit 170 that is part of and/or operably connected to the operational component 132. (The operational component 132 may be, for example, a CDU.) The network adapter module 201 and network interface unit 170 may be electrically interconnected (e.g., communicatively coupled) by a network cable 172. For example, if the network adapter module 201 and network interface unit 170 are configured as part of an Ethernet LAN, the network cable 172 may be a CAT-5E cable. The network interface unit 170 may be communicatively coupled to one or more software or hardware applications 174 in the operational component 132 that are configured for communicating through the system network 110. In particular embodiments, the network interface unit 170, network cable 172, and software or hardware applications 174 include Ethernet-ready components. For example, the network interface unit 170 may be an Ethernet adapter connected to a network device for carrying out network communications.

The network adapter module 201 is configured to receive the network data 116 from the network interface unit 170 over the network cable 172. The network adapter module 201 may convey the network data 116 to one or more of the modules 202-206. For example, the network data 116 may be sent to the signal modulator 202. The signal modulator may modulate the network data 116 and transmit the modulated network data 116 over the MU cable system 126. Before or after being modulated, the signal modulator 202 may transmit the network data to one or more of the modules 204-206.

The signal demodulator 203 is configured to receive transformed network data 116' through the MU cable system 126 and demodulate the transformed network data 116' into network data 116 that is capable of being communicated within the corresponding vehicle network 190. The signal demodulator 203 may convey the network data 116 to the network adapter module 201 for transmission to the network interface unit 170. One or each of the network adapter module 201, the signal modulator 202, or the signal demodulator 203 may perform various processing steps on the network data 116 and/or the transformed network data 116' for transmission and reception over the MU cable system 126 and/or over the network cable 172.

The signal modulator 202 and the signal demodulator 203 may include an electrical output for electrical connection to the MU cable system 126. Each of the signal modulator 202 and the signal demodulator 203 may include internal circuitry (e.g., electrical and isolation components, microcontroller, software/firmware) for receiving the network data, transforming the network data, and communicating the network data. The internal circuitry may be configured to modulate (or de-modulate) data using schemes such as those utilized in VDSL or VHDSL (very high bit rate digital subscriber line) applications, or in power line digital subscriber line (PDSL) applications. One example of a modulation scheme may include orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation scheme may involve applying a carrier wave (at a particular frequency orthogonal to frequencies used for non-network data in the MU cable system) and modulating the carrier wave using digital signals corresponding to the network data 116.

The encapsulation module 204 is configured to receive a local data packet of the network data 116 from the operational component 132. The local data packet may be in a first packet format. For example, the local data packet may be an IPv4 data packet. The encapsulation module 204 is configured to transform the local data packet into an in-tunnel data packet. The in-tunnel data packet may have a different second packet format that is configured to be transmitted through the communication link (e.g., wired and/or wireless communication link) to the linked vehicle. For example, the in-tunnel data packet may be an IPv6 data packet. In some embodiments, the local data packet may be carried by the in-tunnel data packet to one of the linked vehicles. In some embodiments, the local data packet is characterized as being encapsulated within the in-tunnel data packet.

In some embodiments, the encapsulation module 204 may be configured to prepend (e.g., add) a different address to the local packet. The encapsulation module 204 may change the destination and source addresses of the data packet to different addresses. For instance, the destination address may be changed to an in-tunnel address that represents a target operational component. In some embodiments, an address may "represent" an operational component when the address is the actual address of the operational component or the address is a proxy address that corresponds to or is associated with the operational component such that the operational component receives the data packet based on the address that represents the operational component. For example, an address that "represents" an operational component may be a proxy address that is uniquely associated with the operational component. The in-tunnel address may include a header portion that directs the in-tunnel data packet to a designated linked vehicle or LAN.

The translation module 205 is configured to receive an in-tunnel data packet from the MU cable system 126, which transmitted the in-tunnel data packet from another vehicle network. The in-tunnel data packet may have a designated packet format (e.g., IPv6) that is capable of being transmitted through the MU cable system 126 between vehicle networks. The translation module 205 is configured to transform the in-tunnel data packet into a local data packet having the first packet format. The translation module 205 may change one or more addresses of the in-tunnel data packet so that the local data packet (or the payload portion) is sent to the target operational component. The route generator 206 is described in greater detail below with respect to the route generators 316, 356 (FIG. 5).

Figure 5:
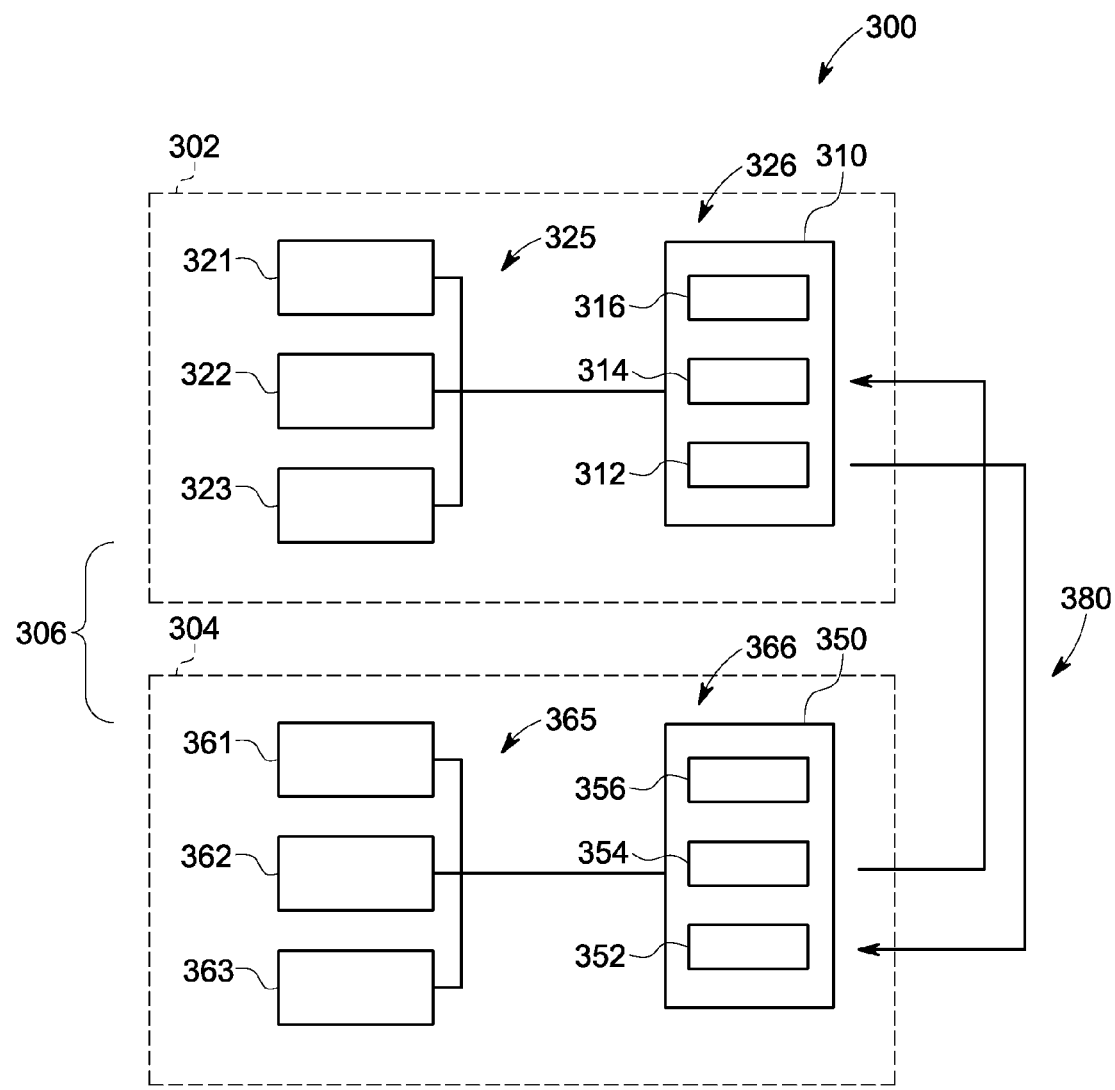
FIG. 5 is a schematic view of a system network in accordance with one embodiment.

FIG. 5 is a schematic view of a system network (or communication system) 300 formed in accordance with one embodiment that may be similar to the system network 110. FIG. 5 illustrates one example of how different vehicles 302, 304 of a vehicle system 306 may communicate with each other. The vehicles 302, 304 may be mechanically and communicatively coupled to each other and be part of a common vehicle consist. The vehicle consist may include additional vehicles (not shown). The vehicles 302, 304 may be similar to the vehicles 118a-118c (FIG. 1) described above. For example, the vehicle 302 includes a router transceiver unit 310, and the vehicle 304 includes a router transceiver unit 350. The router transceiver unit 310 includes an encapsulation module 312, a translation module 314, and a route generator 316. The router transceiver unit 350 includes an encapsulation module 352, a translation module 354, and a route generator 356. The router transceiver units 310, 350 may be similar to the router transceiver unit 134 (FIG. 4) described above. The router transceiver units 310, 350 may coordinate operations to communicate network data therebetween.

As shown, the vehicle 302 may also include a plurality of operational components 321-323, and the vehicle 304 may also include a plurality of operational components 361-363. The operational components 321-323 are communicatively coupled to the router transceiver unit 310 directly or indirectly through a communication channel 325, and the operational components 361-363 are communicatively coupled to the router transceiver unit 350 directly or indirectly through a communication channel 365. The communication channels 325, 365 may include wired connections, wireless connections, or a combination thereof. The communication channel 325, the operational components 321-323, and the router transceiver unit 310 may be part of a vehicle network 326. Likewise, the communication channel 365, the operational components 361-363, and the router transceiver unit 350 may be part of a vehicle network 366.

In some embodiments, the vehicle networks 326, 366 are separate networks that are communicatively coupled to each other through a communication link 380. The communication link 380 may be part of a MU cable system, such as the MU cable system 126 (FIG. 1). The communication link may include wired connections, wireless connections, or a combination thereof. In particular embodiments, the vehicle networks 326, 366 are LANs and the system network 300 constitutes a larger network that includes the vehicle networks 326, 366 as sub-networks. For example, the system network 300 may be characterized as a WAN.

In some embodiments, each of the router transceiver units 310, 350 may have a fixed (e.g., predefined) network address (e.g., IP address) within the vehicle networks 326, 366, respectively. The corresponding operational components may be configured to (e.g., programmed to) communicate with the fixed network address when the operational components are communicatively coupled to the vehicle networks 326, 366.

Each of the operational components 321-323 and 361-363 may have a network address (e.g., IP address) within the corresponding vehicle network. In some cases, the network addresses for at least one of the operational components 321-323 and/or for at least one of the operational components 361-363 is predefined or known. In particular, the predefined network addresses may be assigned according to a designated addressing scheme. By way of example only, positive train control (PTC) related equipment may have known addresses that are established or assigned by an industry or proprietary standard. When the operational components with predefined network addresses are communicatively coupled with the corresponding vehicle network, the router transceiver units may assume to know the network addresses of the corresponding operational components. Messages may be sent therebetween to confirm that the operational components are communicatively coupled to the corresponding router transceiver unit and are properly operating.

The vehicles 302, 304 may also include operational components that do not have predefined or fixed network addresses within the vehicle networks 326, 366, respectively. Various process or operations may be executed for identifying such components. For example, the operational components may announce or notify the router transceiver units 310, 350 that the operational components are communicatively coupled on the corresponding vehicle network. Alternatively, the router transceiver units 310, 350 may detect the operational components through pinging or by port scanning, wherein the router transceiver units 310, 350 identify unique port signatures.

By knowing the predefined network addresses and detecting the operational components having unknown network addresses, the router transceiver unit 310 may generate or build a component list that includes a list of the operational components that are available on the vehicle network 326. The router transceiver unit 350 may also generate or build a component list that includes a list of the operational components that are available on the vehicle network 366. The component lists may be shared by the router transceiver units 310, 350 to generate a target list of operational components.

The network addresses within each of the vehicle networks 326, 366 (e.g., the network addresses for the operational components 321-323 and 361-363 and the router transceiver units 310, 350) may be configured according to a designated communications protocol. For example, the network addresses within each of the vehicle networks 326, 366 may be configured according to IPv4. In other embodiments, however, the vehicle networks 326, 366 may be configured according to a different communications protocol (e.g., IPv6). In yet other embodiments, the vehicle networks 326, 366 may not be based on the same communications protocol (e.g., one may be IPv4 and the other may be IPv6). In particular embodiments, the vehicle networks 326, 366 are incapable of communicating in accordance with IPv6.

Within the system network 300, the router transceiver units 310, 350 may have designated network addresses. The network addresses may be configured according to a designated communications protocol. In particular embodiments, the designated communications protocol is different than the communications protocol used by the vehicle networks 326, 366. As one example, the designated network addresses for the router transceiver units 310, 350 for communicating between vehicles 302, 304 may be configured according to IPv6. The router transceiver units 310, 350 may use link-local addresses based on media access control (MAC) addresses of corresponding network adapter modules of the router transceiver units 310, 350. Accordingly, each of the router transceiver units 310, 350 may have a network address in the corresponding vehicle network and a different network address in the system network 300.

On the system network 300, the router transceiver units 310, 350 are configured to communicate with each other. For example, the router transceiver units may communicate messages (e.g., data packets) of a designated type between each other. In some embodiments, the designated type of messages is user datagram protocol (UDP). The messages may be broadcast messages or unicast messages. Broadcast messages may be configured to be sent to a plurality of vehicles on a system network. Unicast messages may be configured to be sent to a designated vehicle on the system network.

In some embodiments, the broadcast messages do not require a reply message that confirms the broadcast message was received. By way of example, each of the router transceiver units 310, 350 may be configured to transmit broadcast messages that include a vehicle identification (ID) of a vehicle. Messages with the vehicle ID advertise to the other vehicles on the system network that a particular vehicle is communicatively coupled to the system network. In some embodiments, the unicast messages require a reply message to confirm that the unicast message was received. If a reply message is not received within a designated time period, the unicast message may be resent. The unicast messages may be sent to other router transceiver units to request that a static route or tunnel be established between the router transceiver units.

In some embodiments, the router transceiver units 310, 350 may determine the vehicle networks that are currently coupled to the system network 300. The router transceiver units 310, 350 may use a protocol that is similar or identical to the Neighbor Discovery Protocol (NDP) to detect if other vehicle networks (e.g., other router transceiver units) are communicatively coupled to the system network 300. For example, each router transceiver unit may periodically broadcast the vehicle ID (or other identification message) that announces the router transceiver unit is coupled to the system network 300 (e.g., through a MU cable system).

Figure 6A:
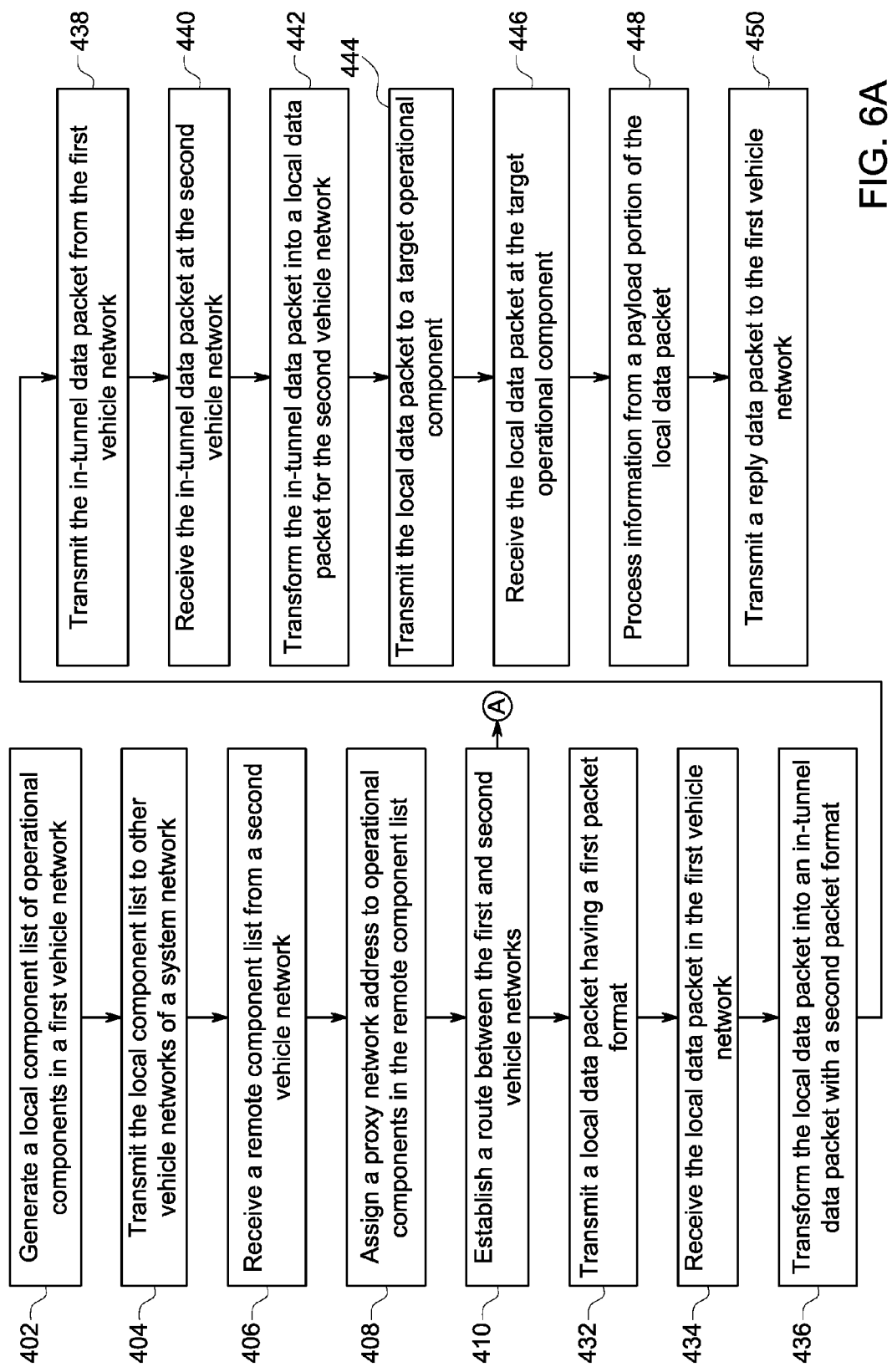

FIGS. 6A and 6B include a flowchart of a method 400 of communicating between different vehicles of a vehicle system, which may be a vehicle consist in some embodiments. FIGS. 6A and 6B are described with reference to the elements of FIG. 5. In the following example, various terms may be used to differentiate similar elements. For example, depending upon the circumstances, a certain vehicle may be described as a "linked" vehicle, a "source" vehicle, or a "destination" vehicle. A linked vehicle may be any vehicle in a vehicle system or consist that is mechanically and communicatively coupled with other vehicles, which may also be referred to as linked vehicles. A source vehicle is the vehicle that is sending an original message or data packet. A destination vehicle is the vehicle that receives the original message or data packet or a transformed version thereof. Likewise, a single address may be a "source" address or a "destination" address depending upon the direction of transmission. Some addresses may also be an "in-tunnel" address. When network devices (e.g., operational components) in different vehicles have a "common" network address, the network devices have the same network address. For example, both may have an IP address of 10.255.255.10.

The method may include generating (at 402) a local component list or table of operational components in a vehicle network. For example, the route generator 316 of the router transceiver unit 310 may generate the local component list by determining a predefined network address for at least one operational component and/or detecting an unknown network address for at least one operational component. For example, the operational components 321 and 322 may have predefined network addresses. The network addresses may be defined by a designated addressing protocol or scheme. In some cases, the predefined network addresses may be based upon an industry standard (e.g., PTC), a proprietary standard, or a publicly-available standard.

The operational component 323 may have an unknown network address. In some embodiments, the operational component 323 may announce or advertise that the operational component 323 is communicatively coupled to the vehicle network 326. In other embodiments, the router transceiver unit 310 may ping or scan the vehicle network 326 to detect any unknown operational components. The route generator 356 of the router transceiver unit 350 may generate a local component list of operational components communicatively coupled to the vehicle network 366 in a similar manner.

Accordingly, the network addresses for each of the operational components in a single vehicle network may be known. As described above, a common network address may be shared by an operational component of each vehicle. For example, the operational component 321 may have the same network address as the operational component 361. Embodiments described herein include methods and systems that differentiate the operational components having a common network address.

The method 400 may also include transmitting (at 404) the local component list of operational components to other vehicles of the vehicle system. For example, the router transceiver unit 310 may send the component list of operational components on the vehicle network 326 to the router transceiver unit 350. The router transceiver unit 350 may receive (at 406) the local component list from the other vehicle, which may be referred to as a remote component list. The router transceiver unit 350 may also send the local component list of operational components on the vehicle network 366 to the router transceiver unit 310.

The method may also include assigning (at 408) a proxy network address to the operational components on a remote component list. For example, the router transceiver unit 310 may have a pool or range of proxy network addresses for assigning to the remote operational components on the component list provided by the router transceiver unit 350. The router transceiver unit 310 may assign a proxy network address for each of the operational components 361-363. Likewise, the router transceiver unit 350 may have a pool or range of proxy network addresses and may assign a proxy network address for each of the remote operational components 321-323. Each of the proxy network addresses may be unique. For instance, none of the operational components 321-323 and 361-363 may have the same proxy network address. A representative pool of proxy network addresses may be the IP addresses in the range of 10.255.255.60 to 10.255.255.80.

The method may also include establishing (at 410) a route or tunnel so that a requesting operational component may communicate with a target operational component (e.g., a designated one of the remote operational components). FIG. 6B includes a flowchart illustrating the establishing (at 410). In some embodiments, establishing (at 410) may include a plurality of sub-operations. For example, establishing (at 410) may include transmitting (at 412) from the requesting operational component a request for a target list of remote operational components that the requesting operational component may communicate with. The request may be received (at 414) and the target list may be transmitted (at 416) to the requesting operational component that sent the request. The target list may include a table that identifies the type of operational components (e.g., CDU, sensor, radio, etc.) and an address indicator that is associated with the network address of the designated remote operational component. The address indicator may include information that identifies the vehicle network (e.g., an ID number) and corresponding network address of the target operational component in the other vehicle network.

Establishing (at 410) may also include receiving (at 418) a route request at the router transceiver unit from a requesting operational component. The route request may include a component identifier field and a vehicle scope field. The component identifier field may identify the target operational component that the requesting operational component would like to communicate with. For example, the operational component 321 may send a route request to the router transceiver unit 310 that includes a component identifier field that identifies the operational component 362. The component identifier may include the network address of the target operational component that was identified from the target list provided by the router transceiver unit 310. More than one target operational component may be requested by the requesting operational component. The vehicle scope field may indicate the vehicle networks that should be communicated with to establish a route or multiple routes. For example, the vehicle scope field may designate a particular vehicle network, a plurality of vehicle networks, or each and every vehicle network in the system network that has a particular type of operational component.

After receiving (at 418) the route request, the router transceiver unit 310 may transmit (at 420) a set-up request to the router transceiver unit 350, which receives (at 422) the set-up request. The router transceiver unit 350 may confirm (at 424) that the requested remote operational component is still available. For example, the router transceiver unit may analyze the list of available operational components and/or transmit a confirmation message to the requested operational component. The router transceiver unit 350 may then transmit (at 426) an acknowledgement message.

The set-up request and/or the acknowledgement message may identify the static routes that may be used to communicate the network data between the router transceiver units 310, 350. More specifically, in order to direct traffic sent through a static route, each of the router transceiver units 310, 350 may select an index number or other address that determines the network address of the corresponding router transceiver unit for a particular exchange. The address of the router transceiver unit for the exchange may be referred to as the in-tunnel address of the corresponding router transceiver unit. For example, each of the router transceiver units 310, 350 may have indices 1-240 that represent available routes. The indices 1-120 may be used for outgoing routes and the indices 121-240 may be used for incoming routes. Depending on the index number chosen, the network addresses may be modified to select the designated static route. For instance, the last octet of the source and destination addresses may be changed to match the selected indices. As one specific example, if the outgoing route for the router transceiver unit 310 was index number 1 and the incoming route for the router transceiver unit 350 was index number 128, then the in-tunnel source address may be 192.168.130.1 and the in-tunnel destination address 192.168.130.128.

As described above, the network addresses in the vehicle networks 326, 366 and the in-tunnel addresses between the router transceiver units 310, 350 may be configured according to a different communications protocol. In the illustrated embodiment, the communications protocol for data packets in the vehicle networks 326, 366 is IPv4, and the communications protocol for data packets transmitted between the router transceiver units 310, 350 is IPv6. However, other communications protocols may be used. By separating two vehicle networks that have the same network addresses for operational components with a connection that uses a different communications protocol, the vehicle networks may be effectively isolated from each other thereby reducing addressing conflicts and errors.

The acknowledgement message may also include address modification rules (e.g., Network Address Translation (NAT) rules) that describe how the destination and source addresses in the data packets should be modified so that the local and remote operational components may communicate with each other. The acknowledgement message may indicate the static route and the address modification rules that were selected by the router transceiver unit 350. Upon receiving the acknowledgement message, the router transceiver unit 310 may generate (at 428) a static route and respective address modification rules. The router transceiver units 310, 350 may communicate with each other so that the address modification rules are created in both router transceiver units 310, 350. The router transceiver unit 310 may transmit (at 430) a reply that informs the requesting operational component that one or more routes have been established to designated target operational components.

In some embodiments, the encapsulation and translation modules 312, 314 of the router transceiver unit 310 and the encapsulation and translation modules 352, 354 of the router transceiver unit 350 are configured to transform data packets at different points along transmission in order to send a local data packet from a requesting operational component to a target operational component and to send a reply data packet from the target operational component to the requesting operational component. By way of example, the operational component 321 may be the requesting operational component, and the operational component 362 may be the target operational component. The encapsulation and translation modules are configured to implement or apply the address modification rules selected by the router transceiver units.

For example, the local router transceiver unit 310 may have the following configurations: (a) a static route to direct traffic to an in-tunnel address of the router transceiver unit 350; (b) an address modification rule to change the destination address of the local data packet from the proxy network address of the router transceiver unit 310 to the in-tunnel address of the router transceiver unit 350 (e.g., index number or other address of the static route); and (c) an address modification rule to change the source address of the local data packet from the network address of the requesting operational component 321 to the in-tunnel address of the router transceiver unit 310. The remote router transceiver unit 350 may have the following configurations: (a) an address modification rule to change the destination address of the in-tunnel data packet from the in-tunnel address of the router transceiver unit 350 to the network address of the target operational component 362; (b) an address modification rule to change the source address of the in-tunnel data packet from the in-tunnel address of the router transceiver unit 310 to the proxy network address of the router transceiver unit 350; and (c) a static route to direct traffic toward the in-tunnel address of the router transceiver unit 310.

The operational component 321 may transmit (at 432) a local data packet to the router transceiver unit 310. The encapsulation module 312 may receive (at 434) the local data packet. The local data packet may have a destination address and a source address. The local data packet may also have a payload portion that includes, for example, at least one of operational data, vehicle data, route data, or trip data. The destination address may be the proxy network address that was provided by the router transceiver unit 310 in the target list and may correspond to or represent the target operational component 362. The source address may be the network address of the requesting operational component 321. When the encapsulation module 312 receives the local data packet, the encapsulation module 312 may confirm that the destination address matches one of the operational components on the target list.

The encapsulation module 312 may transform (at 436) the local data packet into an in-tunnel data packet having a different second packet format. The second packet format may be is configured to be transmitted through the communication link to the linked vehicle. For example, the encapsulation module 312 may change the source address and the destination address of the local data packet so that the addresses conform to the communications protocol for communicating between the vehicle networks 326, 366. More specifically, the destination address of the local data packet may be changed from the proxy network address of the router transceiver unit 310 to the in-tunnel address of the router transceiver unit 350. The source address may be changed from the network address of the operational component 321 to the in-tunnel address of the router transceiver unit 310. The encapsulation module 312 may transmit (at 438) the transformed data packet (e.g., the in-tunnel data packet) to the router transceiver unit 350.

The router transceiver unit 350 may receive (at 440) the in-tunnel data packet from the router transceiver unit 310. More specifically, the translation module 354 may receive the in-tunnel data packet and then transform (at 442) the in-tunnel data packet into a local data packet for the vehicle network 366. A payload portion of the local data packet in the vehicle network 366 may be substantially the same as the payload portion of the local data packet into the vehicle network 326. In particular embodiments, the payload portion remains unchanged from the operational component 321 to the operational component 362. The translation module 354 may then transmit (at 444) the local data packet to the operational component 362, which receives the local data packet (at 446). The received local data packet is similar to the original data packet that was transmitted (at 432). For example, the received local data packet and the original local data packet may be configured for a common communications protocol. Moreover, the received local data packet and the original local data packet may have the same payload portion.

The operational component 362 may process (at 448) information from the payload portion in a predetermined manner and transmit (at 450) a reply data packet to the router transceiver unit 350. The reply data packet may include a payload portion that has data requested by the operational component 321. The replay data packet may be delivered to the operational component 321 in a similar manner as the original data packet was delivered to the operational component 362. In particular embodiments, the reply data packet is delivered using the same in-tunnel addresses for the router transceiver units 310, 350. Accordingly, traffic from other operational components (e.g., other data packets) may be isolated from the established routes and addresses for the requesting operational component 321 and the target operational component 362. In this manner, communication errors and other issues may be reduced.

Moreover, embodiments described herein may be capable of differentiating operational components on different vehicle networks that have a common network address. In particular, the proxy network addresses generated by the router transceiver units may correspond to or represent the operational components of another vehicle network. Each of the proxy network addresses may correspond to a unique in-tunnel address.

In some embodiments, the established routes (or tunnels) may remain open for communications between two operational components provided that the routes are used. For example, if a router transceiver unit determines that a route has not been used for a designated period of time (e.g., 30 seconds, two minutes, five minutes) the router transceiver unit may remove the route. The router transceiver unit may first attempt to confirm that the route is no longer being used by communicating with either the local operational component or the other router transceiver unit.

When a new vehicle is discovered and a vehicle ID is received by a router transceiver unit (e.g., using NDP), the router transceiver units may automatically generate the designated routes as described herein. The router transceiver units may also share information with the new router transceiver units regarding the operational components that are coupled to the corresponding vehicle network. When a vehicle ID has not been received for a designated period of time, the router transceiver units may remove the routes and any rules associated with the removed router transceiver units.

In some embodiments, the router transceiver units 310, 350 and the operational components 321-323 and 361-363 may operate in accordance with or similar to the Service Location Protocol (SLP). SLP is a service discovery protocol that enables applications to discover network addresses of network resources. In some embodiments, the operational components may utilize SLP or similar protocol to identify network resources (e.g., other operational components) that are available through other vehicle networks.

For example, the router transceiver units described herein may function in a similar manner as a "directory agent" as described by SLP and the operational components may function similarly to the "user agents" and/or "service agents" as described by SLP. The directory agent (or the router transceiver units) may operate as a repository or directory for all detectable services (e.g., operational components) on the system network. The user agents (e.g., one or more operational components) may be configured to request services from the directory agent. The service agents may be operational components that do not have a predefined network address. The service agents may announce or advertise a service within the vehicle network, which may be detected by the router transceiver units and, consequently, advertised throughout the system network. In some embodiments, the user agents are the requesting operational components that request a service to be performed and the service agents are the target operational components that perform the service (e.g., data processing).

Embodiments may also include computer readable media with instructions that are configured to direct a processor to execute or perform the various method operations described herein. Embodiments may also include powered vehicles including the router transceiver units or vehicle networks described herein. Moreover, embodiments described herein may include vehicle consists that include the router transceiver units, the vehicle networks, or the system networks described herein.

Embodiments described herein may provide intra-consist routing or communications to generate traffic pipelines between the vehicles of a vehicle system or consist. The router transceiver unit described herein may function as a node or interface between one vehicle and one or more other vehicles in a vehicle consist (or vehicle system). In particular embodiments, the methods and systems described herein may include a combination of LAN and WAN addressing techniques, static routes, and address modification rules in order to allow equipment to communicate between two different vehicles. Alternatively or in addition to, embodiments described herein may provide inter-consist routing or communications to generate traffic pipelines between vehicle consists of a vehicle system. For example, the router transceiver unit described herein may similarly function as a node or interface between one vehicle consist and one or more other vehicle consists of a vehicle system.

Although embodiments or features are described herein in regards to router transceiver units, such embodiments may be applicable to applications of the router transceiver units, or associated with the router transceiver units. Further, although some embodiments are described herein as plural of the router transceiver units being configured to carry out the function(s) in question, it may be the case that not all router transceiver units are so configured, or that such functions are carried out by an element (application) common to plural router transceiver units.

In one embodiment, a system is provided that includes a router transceiver unit that is configured to be disposed onboard a vehicle system. The vehicle system may have at least a source vehicle and a separate linked vehicle that are are communicatively linked with each other through a system network of the vehicle system. The router transceiver unit is configured to be communicatively coupled to a requesting operational component of the source vehicle and the system network. The router transceiver unit is also configured to receive a local data packet from the requesting operational component that is directed toward a target operational component of the linked vehicle. The local data packet is in a first packet format and the router transceiver unit includes an encapsulation module that is configured to transform the local data packet into an in-tunnel data packet. The in-tunnel data packet having a second packet format that differs from the first packet format and that is configured to be transmitted through the system network to the linked vehicle.

In one aspect, the local data packet includes a destination address. The encapsulation module is configured to determine an in-tunnel address based on the destination address of the local data packet. The encapsulation module is further configured to change the destination address of the local data packet to the in-tunnel address when the encapsulation module transforms the local data packet into the in-tunnel data packet.

In another aspect, the router transceiver unit is configured to generate the destination address of the local data packet as a proxy network address that represents the target operational component.

In another aspect, the local data packet includes at least one of operating data, vehicle data, route data, or trip data.

In another aspect, the encapsulation module of the router transceiver unit is configured to transform the local data packet into the in-tunnel data packet such that the second packet format of the in-tunnel data packet is in accordance with Internet Protocol version 6 (IPv6).

In another aspect, the router transceiver unit includes a route generator configured to establish a data tunnel between the linked vehicle and the source vehicle before the local data packet is received by the router transceiver unit.

In another aspect, the local data packet is a first local data packet and the in-tunnel data packet is a first in-tunnel data packet. The router transceiver unit includes a translation module configured to receive a second in-tunnel data packet from the linked vehicle and transform the second in-tunnel data packet into a second local data packet.

In another aspect, the router transceiver unit is configured to be disposed on-board the source vehicle.

In another embodiment, a system is provided that includes a router transceiver unit that is configured to be disposed on-board a vehicle system. The vehicle system may have at least a source vehicle and a separate linked vehicle that are communicatively linked with each other through a system network of the vehicle system. The router transceiver unit is configured to be communicatively coupled to a target operational component of the linked vehicle and the system network. The router transceiver unit is also configured to receive an in-tunnel data packet from a requesting operational component of the source vehicle that is directed toward the target operational component of the linked vehicle. The router transceiver unit includes a translation module that is configured to transform the in-tunnel data packet into a local data packet by changing a packet format of the in-tunnel data packet. The local data packet has a first packet format and the in-tunnel data packet has a second packet format. The first and second packet formats differ from each other.

In one aspect, the in-tunnel data packet includes an in-tunnel address of the router transceiver unit that represents the target operational component.

In another aspect, the local data packet includes at least one of operating data, vehicle data, route data, or trip data from the requesting operational component of the source vehicle.

In another aspect, the second packet format is in accordance with Internet Protocol version 6 (IPv6) when the translation module transforms the in-tunnel data packet into the local data packet.

In another aspect, the router transceiver unit includes a route generator configured to establish a data tunnel between the linked vehicle and the source vehicle before the in-tunnel data packet is received by the router transceiver unit.

In another aspect, the local data packet is a first local data packet and the in-tunnel data packet is a first in-tunnel data packet. The router transceiver unit includes an encapsulation module that is configured to receive a second local data packet from the linked vehicle and transform the second local data packet into a second in-tunnel data packet.

In another aspect, the router transceiver unit is configured to be disposed on-board the linked vehicle.

In another embodiment, a method is provided that includes communicatively coupling at least a source vehicle and a separate linked vehicle that are communicatively linked with each other through a system network of the vehicle system. The method also includes receiving a local data packet from an operational component of the source vehicle, wherein the local data packet is in a first packet format. The method also includes transforming the local data packet into an in-tunnel data packet. The in-tunnel data packet has a second packet format that differs from the first packet format and is configured to be transmitted through the system network to the linked vehicle.

In one aspect, the local data packet includes a destination address, wherein transforming the local data packet includes determining an in-tunnel address based on the destination address of the local data packet and changing the destination address of the local data packet to the in-tunnel address. In some embodiments, the destination address of the local data packet is a proxy network address. The proxy network address representing a target operational component in the linked vehicle.

In another aspect, transforming the local data packet results in the second packet format of the in-tunnel data packet being in accordance with Internet Protocol version 6 (IPv6).

In another embodiment, a method is provided that includes communicatively coupling at least a source vehicle and a separate linked vehicle that are communicatively coupled with each other through a system network of the vehicle system. The method also includes receiving an in-tunnel data packet at the linked vehicle, wherein the in-tunnel data packet was sent from the source vehicle of the vehicle system. The method also includes transforming the in-tunnel data packet into a local data packet by changing a packet format of the in-tunnel data packet. The local data packet has a first packet format, and the in-tunnel data packet has a second packet format that differs from the first packet format. The local data packet is configured to be transmitted within the linked vehicle to a target operational component, and the in-tunnel data packet is configured to be transmitted between the source and linked vehicles.

In one aspect, the in-tunnel data packet includes an in-tunnel address that represents the target operational component.

In another aspect, the second packet format is in accordance with Internet Protocol version 6 (IPv6) when the in-tunnel data packet is transformed into the local data packet.

In another embodiment, a method is provided that includes communicatively coupling first and second linked vehicles that are communicatively coupled through a system network of the vehicle system. The first and second linked vehicles have first and second vehicle networks, respectively. The method also includes communicatively coupling the first vehicle network to a first operational component disposed on-board the first linked vehicle. The method also includes communicatively coupling the second vehicle network to a second operational component disposed on-board the second linked vehicle. Each of the first and second operational components has a common network address. The method also includes assigning first and second in-tunnel addresses that correspond to the first and second operational components, wherein the first and second in-tunnel addresses are different.

In one aspect, the first and second in-tunnel addresses are assigned based on the common network address and first and second network addresses that represent the first and second vehicle networks, respectively. In some embodiments, the first and second network addresses are media access control (MAC) addresses.

In another aspect, the method may also include communicating network data between the first and second vehicle networks in accordance with a first communications protocol and communicating the network data within the first vehicle network and within the second vehicle network according to a second communications protocol. The first and second communications protocols are different. For example, the first communications protocol may IPv6, and the second communications protocol may be IPv4.

In one embodiment, a system is provided that includes a router transceiver unit that is configured to be communicatively coupled to an operational component of a powered vehicle in a vehicle consist and a communication line of the vehicle consist. The router transceiver unit is configured to receive a local data packet from the operational component, wherein the local data packet is in a first packet format. The router transceiver unit has an encapsulation module that is configured to encapsulate the local data packet within an in-tunnel data packet. The in-tunnel data packet has a second packet format that is configured to be transmitted through the communication line to a linked vehicle of the vehicle consist.

In another embodiment, a system is provided that includes a router transceiver unit that is configured to be communicatively coupled to a communication channel of a powered vehicle in a vehicle consist and a communication line of the vehicle consist. The communication channel is configured to transmit data in a first packet format between the router transceiver unit and an operational component of the powered vehicle. The communication line is configured to transmit data in a different second packet format between the router transceiver unit and a linked vehicle of the vehicle consist. The router transceiver unit is configured to receive an in-tunnel data packet through the communication line from the linked vehicle. The in-tunnel data packet encapsulates a local data packet in the second packet format. The router transceiver unit has a translation module that is configured to convert the in-tunnel data packet into the local data packet having the first packet format.

In yet another embodiment, a method is provided that includes receiving a local data packet from an operational component of a powered vehicle in a vehicle consist. The vehicle consist includes the powered vehicle and a linked vehicle that are communicatively coupled through a communication line, wherein the local data packet is in a first packet format. The method also includes encapsulating the local data packet within an in-tunnel data packet having a second packet format that is configured to be transmitted through the communication line. The method also includes transmitting the in-tunnel data packet to the linked vehicle.

In yet another embodiment, a method is provided that includes receiving an in-tunnel data packet at a powered vehicle of a vehicle consist. The in-tunnel data packet is sent from a linked vehicle of the vehicle consist that is communicatively coupled to the powered vehicle through a communication line. The in-tunnel data packet includes a local data packet from the linked vehicle. The local data packet is in a first packet format and the in-tunnel data packet is in a second packet format. The method also includes converting the in-tunnel data packet into the local data packet by stripping an encapsulation from the in-tunnel data packet. The method also includes transmitting the local data packet to the operational component of the powered vehicle.

In an embodiment, a method comprises, for plural rail vehicles or other vehicles in a consist having electronic components with a common network address, a step of assigning unique tunnel addresses for the components. The method further comprises a step of communicating network data between the rail vehicles. The network data is addressed to the tunnel addresses. The method further comprises a step, when the network data is received at the rail vehicles for the electronic components, of communicating payload portions of the network data to the electronic components at the common network address.

In another embodiment, a method is provided that includes, at a first vehicle having a first operational component with a first network address, communicating with a second vehicle to assign different first and second tunnel addresses for the first operational component and for a second operational component, respectively. The second operational component is on-board the second vehicle and has the first network address. The method also includes, at the first vehicle, receiving network data from the second vehicle, wherein the network data is addressed to the first tunnel address assigned for the first operational component. The method also includes communicating a payload portion of the network data to the first operational component at the first network address.

In another aspect, a system comprises a first router transceiver unit and a second router transceiver unit. The first router transceiver unit is configured to be disposed on-board a source vehicle of a vehicle system. The vehicle system has at least the source vehicle and a separate linked vehicle that are communicatively linked with each other through a system network of the vehicle system. The first router transceiver unit is configured to be communicatively coupled to a requesting operational component of the source vehicle and the system network. The first router transceiver unit is also configured to receive a first local data packet from the requesting operational component that is directed toward a target operational component of the linked vehicle. The first local data packet is in a first packet format, and the first router transceiver unit includes an encapsulation module that is configured to transform the first local data packet into an in-tunnel data packet. The in-tunnel data packet has a second packet format that differs from the first packet format and that is configured to be transmitted through the system network to the linked vehicle. The second router transceiver unit is configured to be disposed on-board the linked vehicle. The second router transceiver unit is configured to be communicatively coupled to the target operational component of the linked vehicle and the system network. The second router transceiver unit is also configured to receive the in-tunnel data packet over the system network. The second router transceiver unit includes a translation module that is configured to translate the in-tunnel data packet into a second local data packet for communication to the target operational component, by translating the second packet format of the in-tunnel data packet into the first packet format.

In one aspect, the first and second local data packets may include identical (or nearly identical) content or payload portions. For instance, a local data packet may be transformed to the in-tunnel data packet and then back to the local data packet, with the two instances of the local data packet being spaced apart temporally. The content or payload portion for the first data packet may be vehicle data that is the same vehicle data in the content or payload portion of the second data packet.

In another aspect, a system comprises a first router transceiver unit on a first vehicle and a second router transceiver unit on a second vehicle. The first and second vehicles are communicatively coupled through a system network of the vehicle system. The first vehicle has a first vehicle network, and the second vehicle has a second vehicle network. The first vehicle network is communicatively coupled to a first operational component disposed on-board the first vehicle. The second vehicle network is communicatively coupled to a second operational component disposed on-board the second vehicle. The first and second operational components have a common network address. For communicating data between the first and second operational components over the first and second vehicle networks and through the system network, the first router transceiver unit and the second router transceiver unit are configured to assign first and second in-tunnel addresses that correspond to the first and second operational components, respectively, wherein the first and second in-tunnel addresses are different. For example, for communicating data from the first vehicle network intended for the second operational component of the second vehicle, the first router transceiver unit is configured to transform the data (having the common network address) to the second in-tunnel address.

In one aspect, the first and second operational components have a similar or identical functions. For example, each of the first and second operational components may be a data radio or a control display unit. As another example, each of the first and second operational components may be a system controller of the corresponding vehicle.

The various components (e.g., the router transceiver units) and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. The scope should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments, including the best mode, and also to enable any person skilled in the art to practice the embodiments, including making and using any devices or systems and performing any incorporated methods. The patentable scope is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A system comprising:
 a router transceiver unit configured to be disposed on-board a vehicle system having at least a source vehicle and a separate linked vehicle that are communicatively linked with each other through a system network of the vehicle system, the router transceiver unit configured to be communicatively coupled to a requesting operational component of the source vehicle and the system network, the router transceiver unit also configured to receive a local data packet from the requesting operational component that is directed toward a target operational component of the linked vehicle,
 wherein the local data packet is in a first packet format and the router transceiver unit includes an encapsulation module configured to transform the local data packet that is received by the router transceiver unit from the requesting operational component in the first packet format into an in-tunnel data packet by changing a format of the local data packet from the first packet format to a different, second packet format that is configured to be communicated by the router transceiver unit through the system network to the linked vehicle.

2. The system of claim 1, wherein the local data packet includes a destination address, and the encapsulation module is configured to determine an in-tunnel address based on the destination address of the local data packet, the encapsulation module further configured to change the destination address of the local data packet to the in-tunnel address during transformation of the local data packet into the in-tunnel data packet by the encapsulation module, wherein the destination address is changed by prepending the in-tunnel address to the local data packet.

3. The system of claim 2, wherein the router transceiver unit is configured to generate the destination address of the local data packet, the destination address being a proxy network address that represents the target operational component.

4. The system of claim 1, wherein the local data packet includes at least one of operating data, vehicle data, route data, or trip data.

5. The system of claim 1, wherein the encapsulation module of the router transceiver unit is configured to transform the local data packet into the in-tunnel data packet such that the second packet format of the in-tunnel data packet is in accordance with Internet Protocol version 6.

6. The system of claim 1, wherein the router transceiver unit includes a route generator configured to establish a data tunnel between the linked vehicle and the source vehicle before the local data packet is received by the router transceiver unit.

7. The system of claim 1, wherein the local data packet is a first local data packet and the in-tunnel data packet is a first in-tunnel data packet, the router transceiver unit including a translation module configured to receive a second in-tunnel data packet from the linked vehicle and transform the second in-tunnel data packet into a second local data packet.

8. The system of claim 1, wherein the router transceiver unit is configured to be disposed on-board the source vehicle.

9. The system of claim 1, wherein the encapsulation module is configured to transform the local data packet to the in-tunnel data packet by including the local data packet in the in-tunnel data packet such that the in-tunnel data packet carries the local data packet from the router transceiver unit to the linked vehicle.

10. A system comprising:
a router transceiver unit configured to be disposed on-board a vehicle system having at least a source vehicle and a separate linked vehicle that are communicatively linked with each other through a system network of the vehicle system, the router transceiver unit configured to be communicatively coupled to a target operational component of the linked vehicle and the system network, the router transceiver unit also configured to receive an in-tunnel data packet from a requesting operational component of the source vehicle that is directed toward the target operational component of the linked vehicle,
wherein the router transceiver unit includes a translation module configured to transform the in-tunnel data packet that is received from the requesting operational component into a local data packet by changing a packet format of the in-tunnel data packet, the local data packet having a first packet format and the in-tunnel data packet having a second packet format, the first and second packet formats differing from each other.

11. The system of claim 10, wherein the in-tunnel data packet includes an in-tunnel address of the router transceiver unit that represents the target operational component.

12. The system of claim 10, wherein the local data packet includes at least one of operating data, vehicle data, route data, or trip data from the requesting operational component of the source vehicle.

13. The system of claim 10, wherein the second packet format is in accordance with Internet Protocol version 6 during transformation of the in-tunnel data packet into the local data packet by the translation module.

14. The system of claim 10, wherein the router transceiver unit includes a route generator configured to establish a data tunnel between the linked vehicle and the source vehicle before the in-tunnel data packet is received by the router transceiver unit.

15. The system of claim 10, wherein the local data packet is a first local data packet and the in-tunnel data packet is a first in-tunnel data packet, the router transceiver unit including an encapsulation module configured to receive a second local data packet from the linked vehicle and transform the second local data packet into a second in-tunnel data packet.

16. The system of claim 10, wherein the router transceiver unit is configured to be disposed on-board the linked vehicle.

17. The system of claim 10, wherein the translation module is configured to transform the in-tunnel data packet into the local data packet by decapsulating the local data packet from the in-tunnel data packet such that the local data packet is removed from the in-tunnel data packet.

18. A method comprising:
communicatively coupling at least a source vehicle and a separate linked vehicle that are communicatively linked with each other through a system network of the vehicle system;
receiving a local data packet from an operational component of the source vehicle, wherein the local data packet is in a first packet format; and
transforming the local data packet into an in-tunnel data packet having a second packet format that differs from the first packet format and that is configured to be communicated through the system network to the linked vehicle.

19. The method of claim 18, wherein the local data packet includes a destination address and wherein transforming the local data packet includes determining an in-tunnel address based on the destination address of the local data packet and changing the destination address of the local data packet to the in-tunnel address by prepending the in-tunnel address to the local data packet.

20. The method of claim 19, wherein the destination address of the local data packet is a proxy network address, the proxy network address representing a target operational component in the linked vehicle.

21. The method of claim 18, wherein transforming the local data packet results in the second packet format of the in-tunnel data packet being in accordance with Internet Protocol version 6.

22. The method of claim 18, wherein transforming the local data packet into the in-tunnel data packet includes inserting the local data packet into the in-tunnel data packet such that the in-tunnel data packet carries the local data packet to the linked vehicle.

23. A method comprising:
communicatively coupling at least a source vehicle and a separate linked vehicle that are communicatively coupled with each other through a system network of the vehicle system;

receiving an in-tunnel data packet at the linked vehicle, the in-tunnel data packet being sent from the source vehicle of the vehicle system; and transforming the in-tunnel data packet into a local data packet by changing a packet format of the in-tunnel data packet, the local data packet having a first packet format and the in-tunnel data packet having a second packet format that differs from the first packet format, the local data packet configured to be communicated within the linked vehicle to a target operational component, the in-tunnel data packet configured to be communicated between the source and linked vehicles.

24. The method of claim 23, wherein the in-tunnel data packet includes an in-tunnel address that represents the target operational component.

25. The method of claim 23, wherein the second packet format is in accordance with Internet Protocol version 6 when the in-tunnel data packet is transformed into the local data packet.

26. The method of claim 23, wherein transforming the in-tunnel data packet into the local data packet includes removing the local data packet from the in-tunnel data packet.

27. A method comprising:

communicatively coupling first and second linked vehicles that are communicatively coupled through a system network of the vehicle system, the first and second linked vehicles having first and second vehicle networks, respectively;

communicatively coupling the first vehicle network to a first operational component disposed on-board the first linked vehicle;

communicatively coupling the second vehicle network to a second operational component disposed on-board the second linked vehicle, the first operational component having a common network address and the second operational component having the same common network address; and assigning first and second in-tunnel addresses that correspond to the first and second operational components, respectively, wherein the first and second in-tunnel addresses are different from each other such that router transceiver units disposed onboard the first and second linked vehicles communicate data between the first and second operational components using the respective first and second in-tunnel addresses.

28. The method of claim 27, wherein the first and second in-tunnel addresses are assigned based on the common network address and first and second network addresses that represent the first and second vehicle networks, respectively.

29. The method of claim 28, wherein the first and second network addresses are media access control addresses.

30. The method of claim 27, further comprising communicating network data between the first and second vehicle networks in accordance with a first communications protocol, communicating the network data within the first vehicle network according to a second communications protocol, and communicating the network data within the second vehicle network according to the second communications protocol, wherein the first and second communications protocols are different.

31. The method of claim 30, wherein the first communications protocol is Internet Protocol version 6 and the second communications protocol is Internet Protocol version 4.

* * * * *